Aug. 17, 1965  W. H. NORTON  3,201,568
HEATING UNIT WITH EMBEDDED TUBULAR ELEMENT
Filed Nov. 29, 1962  2 Sheets-Sheet 1
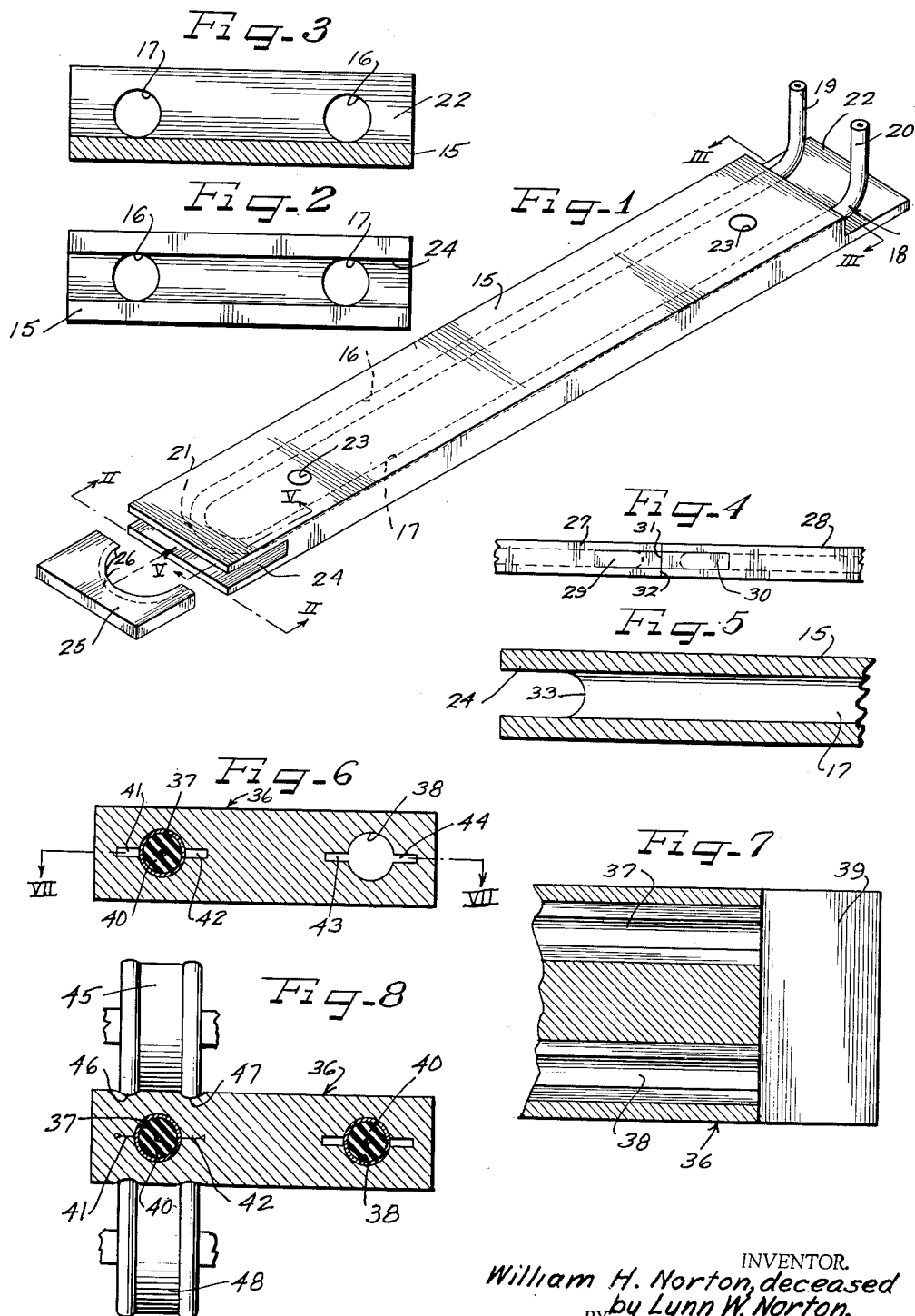
INVENTOR.
William H. Norton, deceased
BY by Lynn W. Norton,
Administratrix
ATTORNEYS

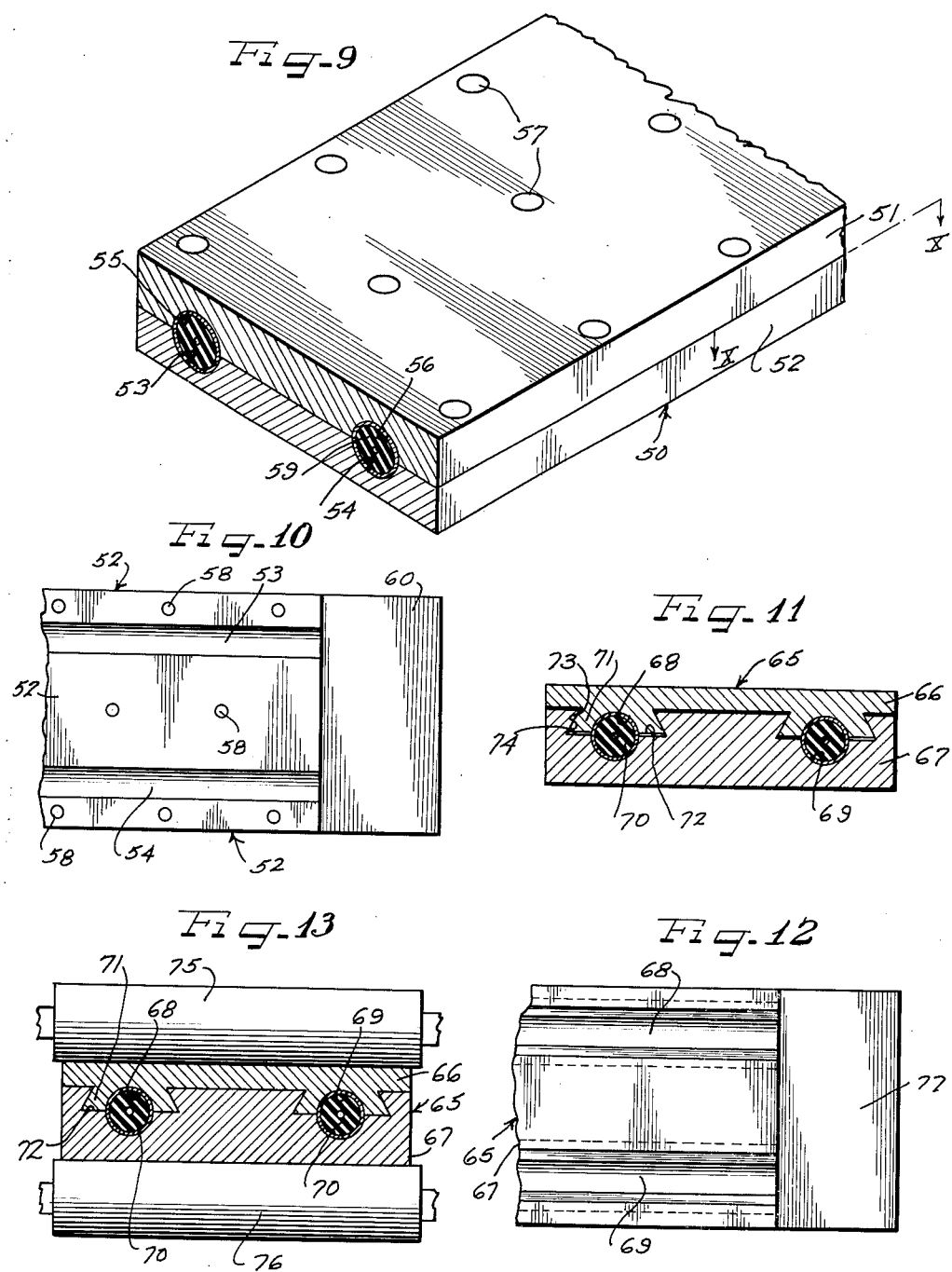

United States Patent Office 3,201,568
Patented Aug. 17, 1965

3,201,568
HEATING UNIT WITH EMBEDDED
TUBULAR ELEMENT
William H. Norton, deceased, late of Mundelein, Ill., by Lynn W. Norton, administratrix, Mundelein, Ill., assignor to Thermel Incorporated, Franklin Park, Ill., a corporation of Delaware
Filed Nov. 29, 1962, Ser. No. 241,069
7 Claims. (Cl. 219—538)

The present invention relates to a heating device, and more particularly to an improved retainer or mount for housing and enclosing a tubular type of electric heating element, and to the method of making the structure.

In a tubular type of electrical heating element a resistance wire is encased within and insulated from an outer protective enclosing tube of metal. Such electrical heating units have enjoyed popularity because of their comparative high efficiency and speed of operation. The units are employed for many purposes where heat is to be transmitted to a surface or to an area and the units are employed industrially or in appliances of various types. It is customary for the distribution of heat to encase or mount the tubular heating elements in a metal enclosure. This has been done in various ways such as by providing channels in a metal plate or bar and laying the tubular element in the channels. Metal plates or bars have also been cast around the tubular elements by supporting the elements in a mold and pouring molten metal into the mold. An essential property of a metal retainer for the tubular element is that it be in good heat conductive relationship with the outer surface of the tubular element. It is also desirable that the retainer or housing for the tube be simple and inexpensive to manufacture.

It is accordingly an important object of the present invention to provide an improved electric heater wherein a tubular heating element is encased or mounted in a plate or a bar by a simplified and improved inexpensive method of manufacture.

A further object of the invention is to provide an improved electric heater wherein a tubular element is encased in a metal bar and wherein the bar is in intimate firm heat conductive relationship with the outer surface of the tube.

A further object of the invention is to provide an improved method of manufacture for an electrical heater wherein it is unnecessary to cast the metal of the retainer around the tubular element and disadvantages of structures heretofore provided are eliminated.

Another object of the invention is to provide an improved structure and method of manufacture thereof for an electrical heater particularly well adapted to enclose a U-shaped tubular heating element in a heavy bar or plate.

Other objects, advantages and features will become more fully apparent with the teaching of the principles of the invention in connection with the disclosure of the preferred embodiments in the specification and claims in conjunction with the accompanying drawings, in which:

FIGURE 1 is a perspective view of a heater, with portions shown in disassembled position, constructed in accordance with the principles of the present invention;

FIGURE 2 is an end elevational view with parts removed, taken substantially along line II—II of FIGURE 1;

FIGURE 3 is a vertical sectional view with parts removed taken substantially along line III—III of FIGURE 1;

FIGURE 4 is a fragmentary side elevational view showing a relationship between two electric heaters;

FIGURE 5 is a fragmentary sectional view taken substantially along line V—V of FIGURE 1;

FIGURE 6 is a vertical sectional view taken through another form of electric heater constructed in accordance with the principles of the present invention;

FIGURE 7 is a fragmentary sectional view taken substantially along line VII—VII of FIGURE 6;

FIGURE 8 is a vertical sectional view shown in somewhat schematic form and illustrating a step in the method of making the heater of FIGURE 6;

FIGURE 9 is a fragmentary perspective view illustrating another form of heater;

FIGURE 10 is a horizontal sectional view taken substantially along line X—X of FIGURE 9 with the heating elements omitted;

FIGURE 11 is a vertical sectional view taken through another form of heater;

FIGURE 12 is a top plan view of the lower section of the structure of FIGURE 11; and FIGURE 13 is a vertical sectional view illustrating somewhat schematically a step in the method of making the heater of FIGURE 11.

On the drawings:

FIGURES 1 through 5 illustrate an electrical heater including a bar or plate 15 with a tubular sleeve type heating element 18 housed or enclosed therein. The heating element 18 has an outer sleeve formed of metal such as stainless steel, and within the element is an elongated resistance wire which may be wound into a helix and embedded in an insulating material such as magnesia. A heating element of this type is described in the William H. Norton U.S. Patent 2,875,312.

The heating element 18 is bent with parallel linear sides 19 and 20 joined by a U-shaped base 21. The bar 15 has linearly extending parallel holes 16 and 17 therethrough for receiving the sides 19 and 20 of the heating element 18.

At one end, the upper half of the bar is cut away as illustrated at 22, down past the axial center of the holes 16 and 17 so that the ends of the tubular elements may be bent upwardly to be attached to terminals for connecting to an electrical circuit.

The other end is provided with an insertion slot 24 which extends laterally across the bar 15 and is open at the end of the bar. The slot has a height substantially equal to the diameter of the holes 16 and 17 and is uniform in depth with planar upper and lower surfaces so as to be in firm surface-to-surface engagement with an end plug 25 which is inserted into the slot 24 after assembly.

The slot 24, FIGURE 5, is provided with a concave surface 33, which is preferably concave in a vertical plane and in a horizontal plane so as to conform substantially exactly to the curvature of the end 21 of the heating element, so that the element will be in firm surface engagement for heat transmission to the metal of the bar 15.

Similarly, the plug 25 has a surface 26 which is concave in vertical and horizontal planes to conform to the outer surface of the base 21 of the heating element so that the plug will be in firm surface heat conductive engagement with the element 18.

The bar 15 is made of metal, preferably of aluminum, and can be made inexpensively and rapidly by an extrusion process. This permits extrusion of a long bar, which can be cut into sections, and one end cut away as illustrated at 22 and the other end formed with slots 24, and this can be readily accomplished by a milling process. The sections of the bar may be provided with mounting means such as illustrated by the holes 23. The U-shaped tubular heating elements 18 are inserted into the holes 16 and 17, and the lead ends are bent upwardly. The plug 25 is then forced into place and secured there such as by spot welding or other suitable securing means.

FIGURE 4 illustrates two adjacent plates 27 and 28 in abutting relationship with their flat surfaced ends 31 and 32 in heat transfer engagement. The end plugs 29 and 30 have end surfaces to conform with the end surfaces of the plates so as also to be in surface-to-surface engagement. The length of the plug, and of the slotted ends of the bars which receive the plugs, is such that it is substantially equal to one-half of the distance between holes 16 and 17, and thus the length of heating element provided in the U-shaped base 21 will be the same per unit of length for the end of the bar as for the body portion of the bar. In other words, uniform heating will occur throughout the length of the bar to the very end, and when bars are placed in abutting relationship as illustrated in FIGURE 4 a uniform temperature can be maintained therealong.

FIGURE 6 illustrates a bar or plate 36 with longitudinally extending holes 37 and 38 therethrough. A tubular sheet type heating element 40 is provided with ends inserted into the holes, and one side of the element is omitted from the hole 38 for purposes of illustration. It will however be understood that the principles of the invention may be employed in various environments without employing a specific U-shaped tubular element.

In accordance with the arrangement of FIGURE 6, a recess or slot 41 is provided extending radially from the hole 37. While only one recess may be employed, in a preferred arrangement diametrically opposed recesses 41 and 42 are provided for the hole 37, and recesses or slots 43 and 44 are provided for the hole 38. These recesses extend laterally or horizontally for ease in collapsing the recesses as will be described in connection with FIGURE 8.

The end of the bar 36 may have the end cut away at 39, as illustrated in FIGURE 7, and this will have the appearance and construction of the arrangement shown at 22 in FIGURE 1. The other end will have a slot and plug in the same manner as the structure of FIGURE 1.

In manufacture and assembly of the unit of FIGURE 6, the bar is conveniently formed of a heat conductive material such as metal and is preferably formed of aluminum inasmuch as it can be inexpensively and readily extruded with the linearly extending holes 37 and 38, and the slots 41, 42, 43 and 44 being formed in one extrusion pass.

The heating elements 40 are inserted into the holes, and a force is then applied to the plate 36 to collapse the slot and thereby draw or press the surface of the holes firmly, and in heat conductive relationship, against the outer surface of the heating element 40.

FIGURE 8 illustrates a preferred arrangement for collapsing the slots 41 and 42, by applying a localized pressure. A shaped roller 45 is forced against the top surface of the plate 36 and has ridges 46 and 47 at its side spaced to correspond with the positions of the slots 41 and 42. A supporting roller 48 backs the plate. These rollers 45 and 48 are rolled along the plate and the pressure will result in the surfaces of the slots being forced together to close the slots thereby drawing the hole 37 to a smaller diameter. As will be seen, the forces for collapsing the slots may be applied by other means such as shaped presses. Also, either one or both of the rollers may have cylindrical surfaces or a table support may be employed in place of the roller 48. Also, two sets of rollers may simultaneously operate on both of the holes 37 and 38 to simultaneously lock in both sides of the heating element 40.

In the arrangement of FIGURE 9, a plate or bar 50 is formed from two half slabs or bars 51 and 52. Each is of identical construction and can be formed by extruding a length having the desired shape and cutting the length into sections.

Each of the slabs has a longitudinally extending channel, as illustrated at 53 and 54 for the slab 52, and as illustrated at 55 and 56 for the slab 51. These channels are of the exact diameter as the sides of the heating element 59 positioned therein. Thus when the slabs 51 and 52 are pressed together, firm heat conductive engagement will occur between the inner surfaces of the channels and the outer surface of the heating element 59. The slabs are provided with holes 58, and are drawn together such as by bolts or rivets 57 passing through the holes. With the channels in the slabs being of the size of the heating elements, when the slabs are drawn together intimate contact must occur, and if desired the channels can be slightly smaller than the tubular heating element 59 so that a compressive engagement actually occurs.

The end of the lower slab is recessed, as shown at 60 for the slab 52 in FIGURE 10. The other end of the assembly is grooved or slotted and when assembled a plug is positioned in the slot which will be formed between the slabs substantially as illustrated in connection with the arrangement of FIGURE 1.

In the arrangement illustrated in FIGURE 11, a heater bar 65 is formed of an upper slab 66 and a lower slab 67. The slabs are each provided with longitudinal grooves of substantially the diameter of a tubular heating element 70 which fits into the grooves, and when the slabs are assembled the grooves provide longitudinally extending holes 68 and 69 in the bar 65.

The slabs are uniquely held together by dovetail joints formed with male portions 71 and female portions 72. These dovetail joints provide each of the slabs with upwardly and downwardly facing surfaces as indicated by the angular surfaces 73 and 74. While dovetail interlocking joints are preferred, other shapes may be employed which will interlock. The slabs 66 and 67 may first be assembled and then the tubular heating elements inserted, or the elements may be laid in the slots of the lower slab 67 before the upper slab is slid into place.

The slabs are provided at the ends with recesses which receive a plug when the slabs are assembled, with the plug having the structural arrangement illustrated in connection with the bar of FIGURE 1. The other end of the lower slab is recessed as shown at 77.

To complete the assembly after the tubular heating elements are in place, vertical forces are applied to press the slabs together and a force sufficient to exceed the yield point of the metal of the slabs is used for permanent deformation.

This is illustrated in FIGURE 13 wherein upper and lower rollers 75 and 76 are rolled along the bar 65 applying a metal deforming pressure. This will cause expansion of the male portion 61 of the dovetail joints to squeeze the male portion outwardly to completely fill the slot 72. This also causes a compression of the metal of the holes 68 and 69 around the tubular heating element 70 so that a firm permanent intimate heat conductive contact is achieved.

Thus it will be seen that I have provided an improved electrical heater which meets the objectives, advantages and features above set forth. A method of making the heater is provided which avoids expensive and disadvantageous methods heretofore available, but obtains a structure which provides tubular heating elements embedded in supporting plates with intimate heat transfer contact between the elements and plates.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. An electric heater comprising in combination,
    an elongated resistor,
    a thermally conductive tube enclosing the resistor and formed with linear sides and a lateral base connecting the sides, an electrically insulative material surrounding the resistor within the tube,
an elongated one-piece retainer bar for the tube having a pair of linear elongated axially extending holes therethrough for containing the sides of the tube, said bar having a recess at one end opening linearly from the bar and containing the base of said tube,
and a close fitting heat conducting plug in said recess having an axially facing concave recess providing a surface for being in surface-to-surface engagement with the tube to be in heat conductive relationship with the base of said tube.

2. An electric heater comprising in combination,
an elongated resistor,
a thermally conductive tube enclosing the resistor and formed with linear sides and a lateral base connecting the sides,
an electrically insulative material surrounding the resistor within the tube,
an elongated one-piece retainer bar for the tube having laterally spaced axially extending parallel holes extending therethrough containing the sides of the tube,
  said bar having an axially opening insertion slot substantially the height of said holes and extending laterally across the end of the bar and containing the base of the tube,
and a close fitting heat conducting plug in said recess having an axially facing concave recess providing a surface for being in surface-to-surface engagement with the tube to be in heat conductive relationship with the base of the tube.

3. An electric heater comprising in combination,
an elongated tubular electrical heating member with an insulated resistor therein formed with sides and a joining base,
a heat conductive one-piece retainer bar having axially extending laterally spaced holes containing the sides of the member,
  said bar having an axially facing end opening insertion slot at one end containing the base,
  said one-piece bar having a portion removed at the other end extending laterally across the bar and exposing said holes with the ends of the member turned outwardly relative to the axis of the bar for connection to terminals,
and a close fitting plug in said slot having an axially facing concave recess providing a surface for being in surface-to-surface engagement with the tube to be in heat conductive engagement with the base of said member.

4. An electric heater comprising in combination,
first and second elongated tubular electrical heating members with insulated resistors therein formed with sides and a joining base,
first and second heat conductive retainer bars having laterally spaced axially extending holes containing the sides of the members,
  each of said bars having an end axially opening insertion slot at one end containing the base of the member,
and close fitting plugs in the slots having an axially facing concave recess providing a surface for being in surface-to-surface engagement with the tube to be in heat conductive engagement with the base of said member,
said bars positioned to extend linearly in end-to-end relationship with said plugs in abutting, heat conductive engagement.

5. An electric heater comprising in combination,
an elongated tubular electrical heating member with an insulated resistor therein,
a heat conductive retainer bar having an elongated hole therein for receiving said member,
and means defining a recess projecting radially from said hole with material on each side of said recess moved together by deformation of the material of the bar to reduce the circumference of the hole so that the material of the bar which surrounds the hole is in close heat conductive engagement with the member.

6. An electric heater comprising in combination,
an elongated tubular electrical heating member with an insulated resistor therein,
a heat conductive metal retainer bar having laterally extending upper and lower planar surfaces and having a linearly extending hole therein for receiving said member,
and means defining radial laterally extending recesses in each side of the hole with the material on each side of said recess moved together and deformed to reduce the circumference of the hole with the material of the bar which surrounds the hole being in close heat conductive engagement with the member.

7. An electric heater comprising in combination,
an elongated tubular electrical heating member with an insulated resistor therein formed with linear sides and a U-shaped joining base,
a heat conductive retainer bar having axially extending laterally spaced holes containing the sides of the member,
  said bar having an axially facing end opening insertion slot at one end containing the base of the member,
a close fitting plug in said slot having an axially facing concave recess providing a surface for being in surface-to-surface engagement with the tube to be in heat conductive engagement with the base of said member,
and means defining radial slots extending laterally on both sides of each of the holes with the material at the sides of the slots moved together and deformed so that the material surrounding the holes is in heat conductive relationship with the sides of the member.

References Cited by the Examiner
UNITED STATES PATENTS

| | | | |
|---|---|---|---|
| 1,828,635 | 10/31 | Abbott | 219—538 X |
| 2,042,203 | 5/36 | Backer | 219—457 |
| 2,543,970 | 3/51 | Horsfall et al. | 29—155.63 |
| 2,591,442 | 4/52 | Lucy-Hulbert et al. | 29—155.64 |
| 2,725,457 | 11/55 | Norton | 219—525 |
| 2,875,312 | 2/59 | Norton | 219—535 |
| 2,949,875 | 8/60 | Adams | 29—157.3 |
| 2,987,300 | 6/61 | Greene | 165—169 |
| 2,992,314 | 7/61 | Drugmand et al. | 219—535 |
| 3,031,739 | 5/62 | Boggs | 29—155.63 |
| 3,069,526 | 12/62 | Bremer et al. | 219—457 |
| 3,110,795 | 11/63 | Bremer | 219—457 |
| 3,114,823 | 12/63 | Millward | 338—230 X |

RICHARD M. WOOD, *Primary Examiner.*